May 14, 1963 A. R. POULIN 3,089,359
DRILL CONSTRUCTION
Filed May 8, 1961

INVENTOR.
ALLAN R. POULIN
BY
Whittemore, Hulbert & Belknap
ATTORNEYS

United States Patent Office 3,089,359
Patented May 14, 1963

3,089,359
DRILL CONSTRUCTION
Allan R. Poulin, Rochester, Mich., assignor to National Twist Drill & Tool Company, Rochester, Mich., a corporation of Michigan
Filed May 8, 1961, Ser. No. 108,676
12 Claims. (Cl. 77—69)

This invention pertains to a drill construction for reducing drill vibrations and increasing drill life and is particularly adaptable to a drill having a relatively long shank, as for example a gun drill.

This application is a continuation-in-part of my application Serial No. 762,477, filed September 22, 1958, now abandoned.

It is an essential object of this invention to reduce drill vibration, especially in long shank drills, by forming the drill with a large helical flute so that during increased cutting resistance the drill will yield appreciably circumferentially and the shank will tend to wind up providing a strengthened and shortened drill for taking a finer cut, with the shank unwinding and lengthening during a period when the cutting resistance has lessened, thereby suppressing severe drill vibration.

It is a further object of this invention to provide a drill construction having a drill shank with helical flute means formed in a direction thereabout opposite the cutting direction so that the reaction of the cutting force on the shank will cause appreciable circumferential yielding and a winding and shortening of the shank during increased cutting resistance.

It is another object of this invention to provide a drill construction having a drill shank with helical flute means formed in a direction thereabout opposite the cutting direction and having a length, cross-section and flute helix lead so related that the reaction of the cutting force on the shank will cause appreciable circumferential yielding and a winding and shortening of the shank during increased cutting resistance.

It is another object of this invention to provide a helical flute along a drill shank in a direction opposite to the cutting direction, with the depth of the flute extending substantially to the shank axis.

A further object of this invention is to provide a helical flute extending to the drill axis having a cross-section comprising approximately a 115-degree sector of the shank cross-section.

Other objects and features of the invention will become apparent as the description proceeds, especially when taken in conjunction with the accompanying drawing of a preferred embodiment of the invention, wherein.

Figure 1:
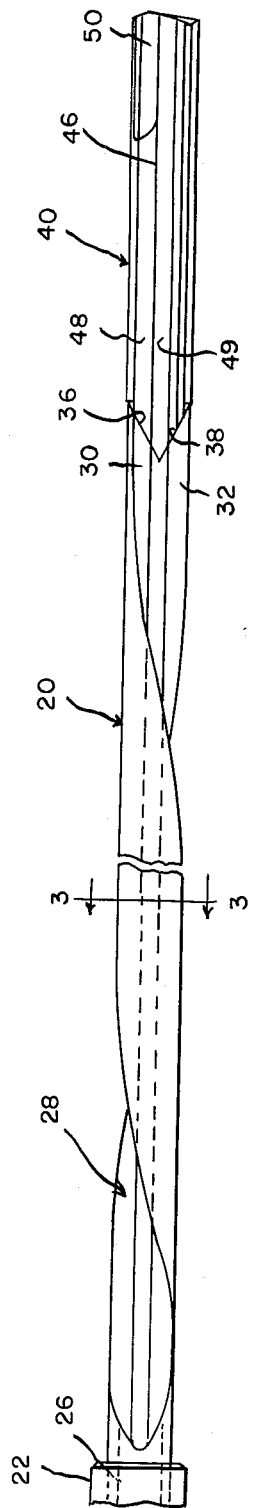
FIGURE 1 is an elevational view of a drill construction of this invention.

Shown in the drawing is a drill construction having a shank 20 of rolled tube construction which is secured at one end to a power adapter sleeve 22. Formed interiorly of shank 20 is an arcuate coolant passage 26 which communicates with a coolant supply (not shown) through sleeve 22 and extends the length of the shank 20 to provide passage for coolant fluid to the cutting end. The narrow width of passage 26 minimizes the lessening of drill strength for a given passage cross-section.

Formed lengthwise of shank 20 is a left-hand helical flute 28 which has walls 30, 32 and an axial groove 34 defining the boundaries thereof. The angle between walls 30, 32 in this embodiment is approximately 115 degrees and has its vertex at the shank center.

The other end of shank 20 has a corner 36 formed thereon for receiving a wedge 38 of cutter attachment 40 which is secured thereon as by welding or brazing. Hole 42 is formed in attachment 40 and communicates with passage 26 in shank 20 and receives coolant fluid therefrom. Rectilinear flute 46 is formed lengthwise in attachment 40 and is defined by center groove 47 and walls 48, 49, which register respectively with walls 30, 32 of flute 28 in shank 20.

Cutter blade 50 is formed of a cutting material and is securely attached to wall 48 and hardened inserts 52 and 54 are fixed to and extend beyond the outer periphery of attachment 40 and are adapted to bear against the drilled walls.

The cross-section of the shank is related to its length such that under relatively heavy cuts within the range normally encountered in use, the shank is appreciably circumferentially yieldable. Due to the fact that the hand of the flute is opposite to the hand of rotation, yielding of the shank between the adapter at one end thereof and the cutting tip at the other has the effect of winding up the drill, thus causing the cutting tip thereof to be displaced by a small increment toward the adapter. This has the effect of relieving the cut while at the same time conditioning the drill for withstanding a greater torque without further yielding. This is to be contrasted with the situation in which the hand of rotation is the same as the hand of the helical flute. In this latter case circumferential yielding of the shank under torsion would tend to unwind the shank, thus extending the cutting tip.

Comparison tests have established a surprising improvement resulting from the shank with a helical flute with a hand opposite to the hand of rotation. Such tests indicate that drill vibration is appreciably reduced and drill life increased with the left hand helical flute described when the drill shank length to diameter ratio is approximately 20 to 1. Further the comparison tests indicate that a flute helix lead to shank diameter ratio of between 10 to 1 and 30 to 1 is desirable. A flute helix lead to diameter ratio of approximately 25 to 1 has produced excellent results in a particular drill construction.

Figure 2:
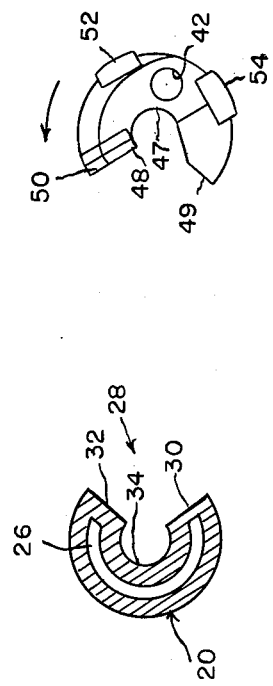
FIGURE 2 is an enlarged end elevation of the embodiment shown in FIGURE 1.
Figure 3:
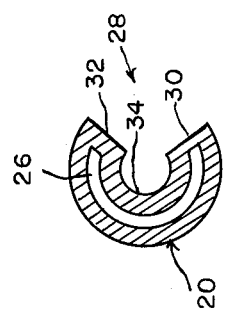
FIGURE 3 is an enlarged section taken at 3—3, FIGURE 1.

In the operation of this embodiment a right-hand rotation in the direction of the arrow in FIGURE 2 is imparted to the drill shank having a left-hand helical flute. The drill is then advanced towards the work piece at a predetermined feed rate, with the cutter blade 46 cutting an annulus about an undrilled core which is received in center groove 49 of flute 46. This invention of course, also applies to center cut drills where there is a cutting member at the drill center.

When cutting resistance to blade 46 increases, the drill shank, owing to the large left-hand flute formed therein and the relation between the length, cross-section, and flute helix lead, begins to wind up, shortening the drill so that a finer cut is taken and when the cutting resistance decreases the drill shank begins to unwind. The transition between heavy and light cutting resistances is therefore relatively gradual, reducing drill vibration and breakage.

The flutes 28 and 50 also act as efficient chip disposal passages. A further factor in reducing drill vibration is the fact that a helically fluted drill is better balanced than a straight fluted drill.

The helical fluted construction also makes the drill stiffer and more resistant to bending in all planes than a straight fluted construction which is especially advantageous for heavy duty operation.

A drill construction of this invention having a drill length of approximately 26 inches and a diameter of approximately ½ inch is capable of speeds including 6000 r.p.m. and operates very satisfactorily at a speed of 3000 r.p.m. with .002 inch feed per revolution, when used as a gun drill.

The drawing and the foregoing specification constitute a description of the improved drill construction in such full, clear, concise and exact terms as to enable any person skilled in the art to practice the invention, the scope of which is indicated by the appended claims.

What I claim as my invention is:

1. A drill having an elongated tubular shank having an adapter at one end and a cutting tip at the other end, designed to cut upon rotation of said drill of a predetermined hand, said shank having a helical flute of lead substantially greater than the diameter of said shank and having a hand opposite to the hand of rotation thereof, the cross-section of said shank being small relative to its length whereby under heavy cuts said shank yields circumferentially to produce substantial angular displacement between said adapter and cutting tip due to the opposite hand of rotation and said helical flute being effective to cause said shank to wind up and shorten to thereby relieve the cut.

2. A drill having an elongated tubular shank having an adapter at one end and a cutting tip at the other end, designed to cut upon rotation of said drill of a predetermined hand, said shank having a single helical flute of lead substantially greater than the diameter of said shank and having a hand opposite to the hand of rotation thereof, the cross-section of said shank being hollow and small relative to its length whereby under heavy cuts said shank yields circumferentially to produce substantial angular displacement between said adapter and cutting tip due to the opposite hand of rotation and said helical flute being effective to cause said shank to wind up and shorten to thereby relieve the cut.

3. A drill having an elongated shank having an adapter at one end and a cutting tip at the other end, designed to cut upon rotation of said drill of a predetermined hand, said shank having a spiral passage of elongated arcuate cross-section extending longitudinally therethrough and having a helical flute having a hand opposite to the hand of rotation thereof, the cross-section of said shank being small relative to its length whereby under heavy cuts said shank yields circumferentially to produce substantial angular displacement between said adapter and cutting tip due to the opposite hand of rotation and said helical flute being effective to cause said shank to wind up and shorten to thereby relieve the cut.

4. A gun drill having an elongated tubular shank having an adapter at one end and a cutting tip at the other end, designed to cut upon rotation of said drill of a predetermined hand, said shank having a helical flute having a hand opposite to the hand of rotation thereof, the length of said shank being substantially greater than ten times the diameter thereof whereby under heavy cuts said shank yields circumferentially to produce substantial angular displacement between said adapter and cutting tip due to the opposite hand of rotation and said helical flute being effective to cause said shank to wind up and shorten to thereby relieve the cut.

5. A gun drill having an elongated shank having an adapter at one end and a cutting tip at the other end, designed to cut upon rotation of said drill of a predetermined hand, said shank having a spiral passage of elongated arcuate cross-section extending longitudinally therethrough, said passage having radially opposite concentric spaced apart arcuate sides extending through more than one hundred eighty degrees of arc, said shank also having a helical flute having a hand opposite to the hand of rotation thereof including a sector of approximately one hundred fifteen degrees of the shank cross-section, the length of said shank being approximately twenty times the diameter thereof whereby under heavy cuts said shank yields circumferentially to produce substantial angular displacement between said adapter and cutting tip due to the opposite hand of rotation and said helical flute being effective to cause said shank to wind up and shorten to thereby relieve the cut.

6. A drill having an elongated shank provided with a longitudinally extending coolant passage therethrough and having an adapter at one end and a cutting tip at the other end, designed to cut upon rotation of said drill of a predetermined hand, said shank having a helical flute of lead substantially greater than the diameter of said shank and having a hand opposite to the hand of rotation thereof, the cross-section of said shank being small relative to its length whereby under heavy cuts said shank yields circumferentially to produce substantial angular displacement between said adapter and cutting tip due to the opposite hand of rotation and said helical flute being effective to cause said shank to wind up and shorten to thereby relieve the cut.

7. A gun drill having an elongated shank having an adapter at one end and a cutting tip at the other end, designed to cut upon rotation of said drill of a predetermined hand, said shank having a center groove and a helical flute terminating in the center groove radially of the shank of lead substantially greater than twice the diameter of said shank and having a hand opposite to the hand of rotation thereof, the cross-section of said shank being small relative to its length for providing circumferential yielding and substantial angular displacement between said adapter and cutting tip on heavy cuts due to the opposite hand of rotation and said helical flute permitting said shank to wind up and shorten to thereby relieve the cut.

8. A gun drill having an elongated shank having an adapter at one end and a cutting tip at the other end, designed to cut upon rotation of said drill of a predetermined hand, said shank having a center groove and a helical flute terminating in the center groove radially of the shank having a hand opposite to the hand of rotation thereof, the cross-section of said shank being small relative to its length for providing circumferential yielding and substantial angular displacement between said adapter and cutting tip on heavy cuts due to the opposite hand of rotation and said helical fluite permitting said shank to wind up and shorten to thereby relieve the cut.

9. A gun drill having an elongated shank having an adapter at one end and a cutting tip at the other end, designed to cut upon rotation of said drill of a predetermined hand, said shank having a center groove and a helical flute terminating in the center groove radially of the shank having a hand opposite to the hand of rotation thereof, and a lead providing a ratio in comparison with the shank diameter of at least 10 to 1, the cross-section of said shank being small relative to its length for providing circumferential yielding and substantial angular displacement between said adapter and cutting tip on heavy cuts due to the opposite hand of rotation and said helical flute permitting said shank to wind up and shorten to thereby relieve the cut.

10. A gun drill having an elongated shank having an adapter at one end and a cutting tip at the other end, designed to cut upon rotation of said drill of a predetermined hand, said shank having a center groove and a helical flute terminating in the center groove radially of the shank having a hand opposite to the hand of rotation thereof, and a lead providing a ratio in comparison with the shank diameter of approximately 25 to 1, the cross-section of said shank being small relative to its length for providing circumferential yielding and substantial angular displacement between said adapter and cutting tip on heavy cuts due to the opposite hand of rotation and said helical flute permitting said shank to wind up and shorten to thereby relieve the cut.

11. A gun drill having an elongated shank having an adapter at one end and a cutting tip at the other end, designed to cut upon rotation of said drill of a predetermined hand, said shank having a center groove and a helical flute terminating in the center groove radially of the shank having a hand opposite to the hand of rotation thereof, the cross-section of said shank being small relative to its length to provide a shank length to shank diameter ratio of approximately 25 to 1, for providing circumferential yielding and substantial angular displacement between said adapter and cutting tip on heavy cuts due to the opposite hand of rotation and said helical flute permitting said shank to wind up and shorten to thereby relieve the cut.

12. A gun drill having an elongated shank having an adapter at one end and a cutting tip at the other end, designed to cut upon rotation of said drill of a predetermined hand, said shank having a center groove and a helical flute terminating in the center groove radially of the shank having a hand opposite to the hand of rotation thereof and a lead providing a ratio in comparison with the shank diameter of approximately 25 to 1, the cross section of said shank being small relative to its length to provide a shank length to shank diameter ratio of approximately 25 to 1 for providing circumferential yielding and substantial angular displacement between said adapter and cutting tip on heavy cuts due to the opposite hand of rotation and said helical flute permitting said shank to wind up and shorten to thereby relieve the cut.

References Cited in the file of this patent
UNITED STATES PATENTS
2,377,329    Dettmer _____ June 5, 1945